(12) United States Patent
Kielbowicz

(10) Patent No.: US 8,660,231 B2
(45) Date of Patent: Feb. 25, 2014

(54) STORAGE RACK ARRANGEMENT FOR THE STORAGE OF NUCLEAR FUEL ELEMENTS

(75) Inventor: Stanislaw Kielbowicz, Waedenswil (CH)

(73) Assignee: CCI AG, Winterthur (CH)

( * ) Notice: Subject to any disclaimer, the term of this patent is extended or adjusted under 35 U.S.C. 154(b) by 191 days.

(21) Appl. No.: 12/684,807

(22) Filed: Jan. 8, 2010

(65) Prior Publication Data

US 2010/0177858 A1 Jul. 15, 2010

(30) Foreign Application Priority Data

Jan. 9, 2009 (EP) .................................... 09150337

(51) Int. Cl.
*G21C 19/07* (2006.01)
*G21F 5/012* (2006.01)
*G21C 19/00* (2006.01)
*G21F 5/00* (2006.01)

(52) U.S. Cl.
USPC ..... 376/272; 376/260; 250/505.1; 250/506.1; 976/DIG. 244; 976/DIG. 245; 976/DIG. 247; 976/DIG. 248

(58) Field of Classification Search
USPC ......... 376/272, 260; 250/506.1, 507.1, 493.1, 250/496.1, 497.1, 498.1, 505.1; 976/DIG. 244, DIG. 245, DIG. 247, 976/DIG. 248
See application file for complete search history.

(56) References Cited

U.S. PATENT DOCUMENTS

| | | | | |
|---|---|---|---|---|
| 4,034,227 A | * | 7/1977 | Soot ............................... | 376/272 |
| 4,088,897 A | * | 5/1978 | Soot ............................... | 376/272 |
| 4,187,433 A | * | 2/1980 | Zezza ............................. | 376/272 |
| 4,288,699 A | * | 9/1981 | Van der Vlis et al. ......... | 376/272 |
| 4,305,787 A | * | 12/1981 | Rivacoba ....................... | 376/272 |
| 4,348,352 A | | 9/1982 | Knecht | |
| 4,366,115 A | * | 12/1982 | Schlumpf ....................... | 376/272 |
| 4,382,060 A | * | 5/1983 | Holtz et al. .................... | 376/272 |
| 4,400,344 A | * | 8/1983 | Wachter et al. ................ | 376/272 |
| 4,788,030 A | * | 11/1988 | Bosshard ....................... | 376/272 |
| 4,820,472 A | * | 4/1989 | Machado et al. .............. | 376/272 |
| 4,900,505 A | * | 2/1990 | Machado et al. .............. | 376/272 |
| 4,960,560 A | * | 10/1990 | Machado et al. .............. | 376/272 |
| 5,196,161 A | * | 3/1993 | Lewis ............................ | 376/272 |
| 5,245,641 A | * | 9/1993 | Machado et al. .............. | 376/272 |
| 5,311,563 A | * | 5/1994 | Schabert et al. ............... | 376/272 |
| 5,361,281 A | * | 11/1994 | Porowski ....................... | 376/272 |
| 5,365,556 A | * | 11/1994 | Mallie ............................ | 376/272 |
| 8,223,914 B2 | * | 7/2012 | Maeda ............................ | 376/272 |

FOREIGN PATENT DOCUMENTS

| | | |
|---|---|---|
| DE | 198 29 295 A1 | 1/2000 |
| EP | 0 028 010 A | 5/1981 |
| EP | 0 537 615 A1 | 4/1993 |

* cited by examiner

*Primary Examiner* — Bernarr Gregory
(74) *Attorney, Agent, or Firm* — Stetina Brunda Garred & Brucker

(57) ABSTRACT

A storage rack arrangement (10) for the storage of nuclear fuel elements in a storage pool includes at least two storage racks (1.1-1.3) which each contain a plurality of vertical channels (9) arranged next to one another for the reception of the fuel elements, with positioning elements (6) being provided at the storage racks at the bottom. The storage racks are connected to one another at the top and the storage rack arrangement (10) additionally includes one or more base plates (2.1-2.3) which are provided with positioning members (8) which fit with the positioning elements (6) of the storage racks (1.1-1.3) and which, together with the positioning elements, position the storage racks with respect to the base plate or base plates (2.1-2.3) to prevent a displacement of the storage racks on the base plate or plates.

20 Claims, 4 Drawing Sheets

STORAGE RACK ARRANGEMENT FOR THE STORAGE OF NUCLEAR FUEL ELEMENTS

CROSS-REFERENCE TO RELATED APPLICATIONS

This application claims the priority of European Application No. 09150337.5, filed on Jan. 9, 2009, the disclosure of which is incorporated herein by reference.

BACKGROUND OF THE INVENTION

The invention relates to a storage rack arrangement for the storage of nuclear fuel elements.

Nuclear fuel elements and in particular spent nuclear fuel elements are stored in storage pools which are filled with a coolant such as water which simultaneously serves as a shield against the radiation of the fuel elements. The spent nuclear fuel elements remain in the storage pool for so long until they are supplied for reprocessing or, on a case by case basis, final disposal. Storage racks have been developed for the safe storage of nuclear fuel elements, wherein a storage pool can accept a plurality of storage racks which can be arranged side by side and, on a case by case basis, also above one another.

A storage rack is known from document DE 29 30 237 A1 for the storage of nuclear fuel elements which contains a plurality of vertical shafts or channels for the reception of the fuel elements, with the walls of the chancels being formed from sheet metal strips arranged above one another. The sheet metal strips are provided with incisions at their lower and upper margins by means of which the sheet metal strips pushed into one another cross-wise are mutually held. The sheet metal strips are arranged between an upper grid plate and a lower grid plate which are connected by braces. The channels and the fuel elements are supported on the lower grid plate in the described storage rack.

A further storage rack for the storage of nuclear fuel elements in a storage pool is described in the document U.S. Pat. No. 4,042,828. The storage rack contains a plurality of upright enclosures arranged in rows and forming channels for the reception of the fuel elements. The enclosures which have a square cross-section are arranged in an open rack frame and are open at the lower and upper ends so that the water contained in the storage pool can circulate in the enclosures to cool the fuel elements. The fuel elements placed into the enclosures are supported individually on the floor of the storage pool via supports.

It has been found that the above-described storage racks from the prior art only satisfy the demands of a safe storage of the fuel elements with reservations in that noticeable displacements of the storage racks in the storage pools are in particular determined during earthquakes. A storage rack fully loaded with fuel elements typically has a weight between 30 tons and 60 tons so that the forces which occur during an earthquake between adjacent storage racks and between the storage racks and the walls of the storage pool are substantial and there is the risk that the storage racks and the fuel elements stored therein and/or the lining of the storage pool may be damaged during an earthquake and that radionuclides may be released in this process.

FIGS. 9, 13 and 14 from the aforesaid document U.S. Pat. No. 4,042,828 show holding clamps by means of which storage racks disposed next to one another can be connected. A displacement between the storage racks during an earthquake can be avoided at least in principle by a connection of the storage racks. The manner of construction of the storage racks described in the named document, however, appears unsuitable to take up larger horizontal forces so that the security against earthquakes can only be increased with limitations by means of the holding clamps.

To get to grips with the problem of the earthquake-induced storage rack displacements and the risk associated therewith of the collision with the walls of the storage pool or other apparatus installed in the storage pool, attempts have been made to support the storage racks at the walls of the storage pool and/or to anchor them or screw them tight to the floor of the storage pool. In the past, a plurality of storage pools have been built which are based on this fixed storage rack principle. It was, however, quickly found that this fixed storage rack principle is subject to limitations. At higher earthquake loads and at a higher storage density or at higher masses of the storage racks, locally extremely high peak loads arise at the anchorage points or support points which would necessarily result in damage to these structures, in particular also in leaks in the liner of the storage pool. For this reason, a solution was sought which is suitable for higher earthquake loads and higher storage densities.

A substantial improvement for this problem is provided by the so-called "free-sliding" principle which has established itself in newly built fuel element stores in the past few years. In this principle, the storage racks are installed freely in the storage pool and can move in a free-sliding manner in an earthquake. A large portion of the seismic energy is destroyed by the friction occurring on the movement. This principle allows the elimination of the locally extremely high peak loads at the anchorage points or support points of the storage racks, but also has specific disadvantages.

One disadvantage is that the earthquake-induced storage rack displacements require a certain free zone all around the storage racks. This is equal to a loss of storage area, which is very expensive.

A further disadvantage is that these displacements result in the formation of irregular spacings of different magnitudes between the support racks and that an irregular arrangement of the storage racks can thereby arise after an earthquake which can result in problems with the later handling of the stored fuel elements.

A further disadvantage results from the fact that storage racks which are loaded partly and in particular unilaterally are excited to sway at high horizontal earthquake accelerations, with the feet of the storage racks, for example, being able to lift 10 to 20 mm from the floor of the storage pool. Such a sway of the storage racks generates very high impact forces on the floor of the storage pool, whereby the risk of a leak of the storage pool is substantially increased. In addition, an increased tendency to storage rack displacement in the direction of the unloaded site is observed which additionally degrades the stability 20 of the storage racks.

SUMMARY OF THE INVENTION

It is the object of the invention to provide a storage rack arrangement for the storage of nuclear fuel elements in a storage pool which is built up according to the "free-sliding" principle, but which avoids or greatly reduces the above-described disadvantages of this principle.

This object is satisfied in accordance with the invention by the storage rack arrangement described herein.

The storage rack arrangement in accordance with the invention for the storage of nuclear fuel elements in a storage pool includes at least two storage racks which each contain a plurality of vertical channels arranged next to one another for the reception of the fuel elements, with positioning elements being provided at the storage racks at the bottom. In addition, storage racks arranged next to one another are connected to one another at the top and the storage rack arrangement additionally includes one or more base plates which are provided with positioning members which fit with the positioning elements of the storage racks and which, together with the positioning elements, position the storage racks with respect to the base plate or base plates, in particular position them in the horizontal direction, to prevent a displacement of the storage racks on the base plate or plates.

In an advantageous embodiment variant, the positioning elements are made as support elements on which the storage racks are supported and the positioning members are made as seats in the base plate or plates to receive the positioning elements of the support racks and/or are made as projecting parts on the base plate or plates, with the projecting parts and the positioning elements of the storage racks engaging into one another to prevent a displacement of the storage racks with respect to the base plate or base plates. In a further advantageous embodiment variant, the support elements are each provided with support members, for example with vertically adjustable support members, to support the storage racks on the base plate or plates and/or on the floor of the storage pool.

Advantageously, no fixed connection is provided between the storage racks and the base plate or plates, but rather only plug connections or holders are provided so that the storage racks can be positioned simply and can be removed if necessary. For example, in that the positioning elements of the storage racks form plug connections or holders with a respective held part in each case together with the positioning members of the base plate or base plates which can, for example, be joined together by lowering the storage racks to secure the storage racks against horizontal displacement with respect to the base plate or base plates.

The base plate or base plates are advantageously displaceable on the floor of the storage pool so that a fuel element store in accordance with the "free-sliding" principle can be built up with the storage rack arrangement.

In an advantageous embodiment, storage racks arranged next to one another are each positioned with and/or connected to at least one common base plate.

If a plurality of base plates are used, they can be arranged at the periphery of the storage racks, for example substantially at the total periphery of the storage racks. The base plate or base plates can also extend over at least 80% of the base area of the storage rack arrangement or substantially over the total base surface of the storage rack arrangement. Furthermore, the base plate or base plates can be larger than the base area of a storage rack and/or the base plate or base plates can project with respect to the storage racks. In an advantageous embodiment variant, the base plates are connected to one another independently of the connection of the storage racks.

In a further advantageous embodiment, the storage racks are each provided with lateral braces. On a case by case basis, the storage racks can be provided on each side with at least three substantially vertically extending braces. Advantageously, the braces of adjacent storage racks are connected to one another in an upper section and/or at the upper end, for example by means of a screw connection.

The storage rack arrangement in accordance with the invention has the advantage that the storage racks are connected to one another at the top in a stable fashion, whereas they are secured at the bottom against displacement on the base plate or plates thanks to the positioning members. If a fixed connection between the storage racks and the base plate or plates is omitted, individual storage racks can be replaced simply, if necessary, or the store can be expanded if there is room in the storage pool. A further advantage is that the base plates are displaceable as required on the floor of the storage pool so that the base plates can be displaced freely together with the storage racks as a block or as a storage rack arrangement under seismic accelerations. It is advantageous in this respect that the horizontal component of shocks is not completely transferred from the storage pool floor to the storage rack arrangement. This applies in particular to the transmission of the higher frequency portions of the horizontal component which is greatly damped by the high mass of the storage rack arrangement and the displaceable arrangement thereof. Furthermore, strains in the storage rack arrangement which can arise due to thermally induced length changes can be limited to a non-harmful amount thanks to the displaceable arrangement of the storage racks. It is moreover advantageous that the base plates act as hydraulic damping elements with respect to the vertical component of shocks. In addition, the sway and tilting movements of the individual storage racks are effectively damped by the connection in the upper part of the storage racks in that the connection limits the oscillation amplitudes of the individual storage racks.

The seismic analyses show that the base plates on which the storage racks are supported have a large damping effect on the vertical movements and above all on the horizontal movements. Furthermore, the displacements of the storage rack arrangement are also greatly reduced by the connection of adjacent storage racks since those storage racks which are loaded partly and in particular unilaterally are coupled to the comparatively large mass of the other storage racks, which decisively brakes the movement process.

The above description of embodiments and embodiment variants only serves as an example. Further advantageous embodiments can be seen from the dependent claims and from the drawing. Furthermore, individual features from the embodiments and embodiment variants described or shown can also be combined with one another within the framework of the present invention to form new embodiments.

DESCRIPTION OF THE DRAWINGS

The invention will be explained in more detail in the following with reference to the embodiments and to the drawing. There are shown FIG. 1 an embodiment of a storage rack arrangement in accordance with the present invention in a side view.

DETAILED DESCRIPTION OF THE INVENTION

Figure 1:
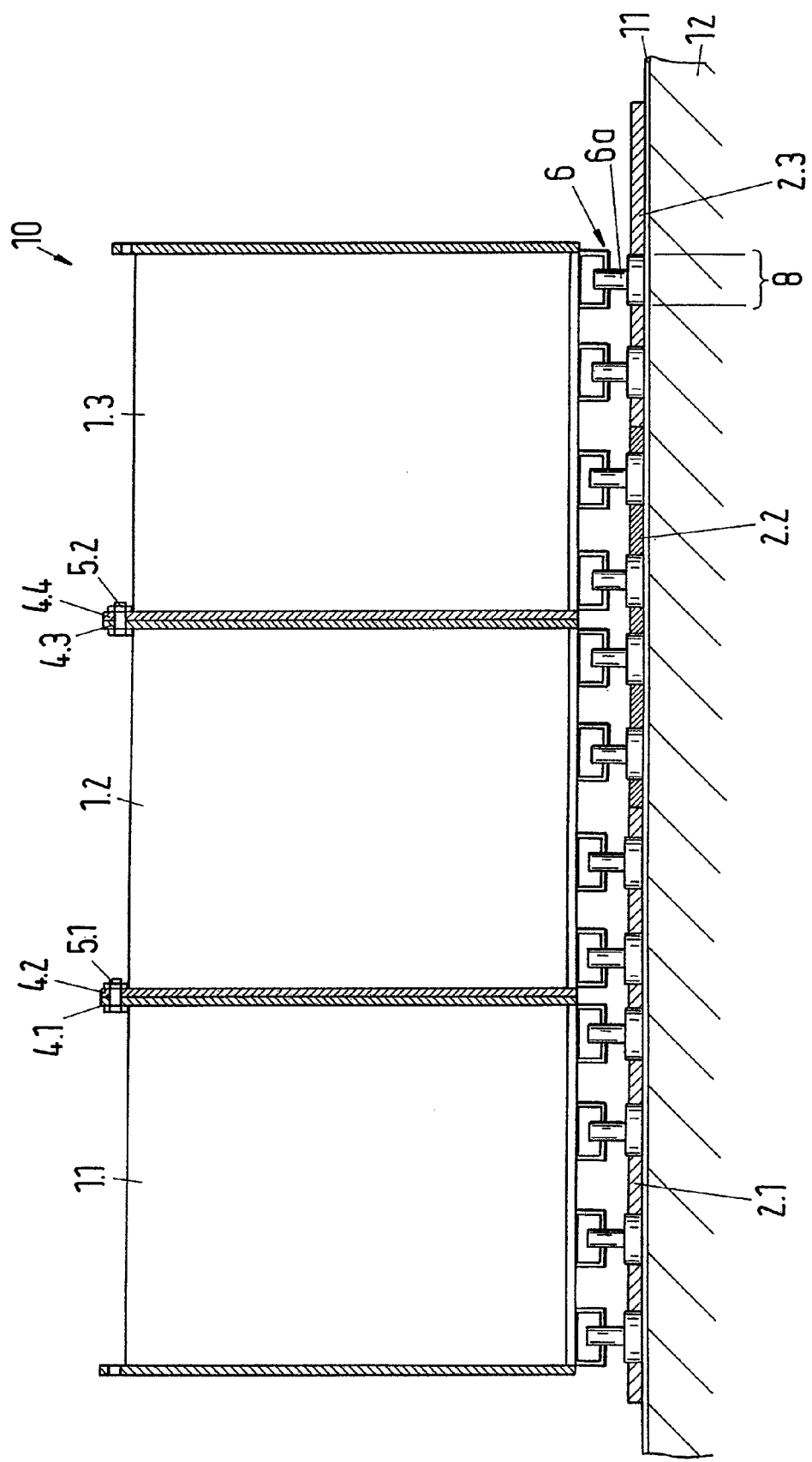

The embodiment of a storage rack arrangement 10 shown in FIG. 1 for the storage of nuclear fuel elements in a storage pool includes at least two storage racks 1.1-1.3 which each contain a plurality of vertical channels arranged next to one another for the reception of the fuel elements, with positioning elements 6 being provided at the storage racks at the bottom. In addition, storage racks 1.1-1.3 arranged next to one another are connected to one another at the top and the storage rack arrangement 10 additionally includes one or more base plates 2.1-2.3 which are provided with positioning members 8 which fit with the positioning elements 6 of the storage racks and which, together with the positioning elements, position the storage racks with respect to the base plate or base plates and in particular fix the horizontal position of the storage racks with respect to the base plate or base plates to prevent a displacement of the storage racks on the base plate or plates.

Advantageously, no fixed connections are provided between the storage racks 1.1-1.3 and the base plate or plates 21.-2.3, but rather plug connections or holders, for example in that the positioning elements 6 are each formed together with the associated positioning member 8 as a plug connection or as a holder with a part to be held. The plug connections or holders with the respective parts to be held can be joined together on the installation of the storage rack arrangement, e.g. by lowering the storage racks onto the base plate or base plates, so that the storage racks are secured against horizontal displacement with respect to the base plate or base plates.

In an advantageous embodiment variant, the positioning elements 6 are, as shown in FIG. 1, made as support elements on which the storage racks 1.1-1.3 are supported and the positioning members 8 are made as seats 1.2 in the base plate or plates 2.1-2.3 and/or as projecting parts on the base plate or plates. In a further advantageous embodiment variant, the support elements 6 are each provided with support members 6a, for example with vertically adjustable support members, to support the storage racks 1.1-1.3 on the base plate or plates 2.1-2.3 and/or on the floor 12 of the storage pool. Irregularities of the storage pool floor can be compensated by means of the vertically adjustable support members which can, for example, contain a thread.

The base plate or base plates 2.1-2.3 are advantageously displaceable on the floor 12 of the storage pool so that a fuel element store in accordance with the "free-sliding" principle can be built up with the storage rack arrangement 10. On a case by case basis, a liner 11 on which the base plate or base plates are displaceable can be provided on the floor 12 of the storage pool. The liner 11 serves for the sealing of the storage pool and can, for example, be manufactured of steel.

In the embodiment shown in FIG. 1, the storage rack arrangement 10 contains three storage racks 1.1-1.3 arranged in a row next to one another in one direction. It is, however, also possible to arrange two storage racks or more than three storage racks in a row next to one another and/or to add one or more further rows in a direction perpendicular thereto to form a storage rack arrangement of the desired size.

In an advantageous embodiment, storage racks 1.1-1.3 arranged next to one another are each positioned with and/or connected to at least one common base plate 2.1-2.3. The dimensions of the base plate or base plates can be selected largely freely as long as the positioning storage rack is designed in a manner extending across storage racks. It can be advantageous in practice to select the base plate or base plates to be so large that at least two positioning elements of the same storage rack disposed next to one another as well as two positioning elements of an adjacent storage rack can be positioned by means of a base plate.

If a plurality of base plates 2.1-2.3 are used, they can be arranged at the periphery of the storage racks 1.1-1.3, for example substantially at the total periphery of the storage racks. The base plate or base plates can also extend over at least 80% of the base area of the storage rack arrangement or substantially over the total base surface of the storage rack arrangement. Furthermore, the base plate or base plates can be larger than the base area of a storage rack and/or the base plate or base plates can project with respect to the storage racks. In an advantageous embodiment variant, the base plates 2.1-2.3 are connected to one another independently of the connection of the storage racks 1.1-1.3.

Figure 3:
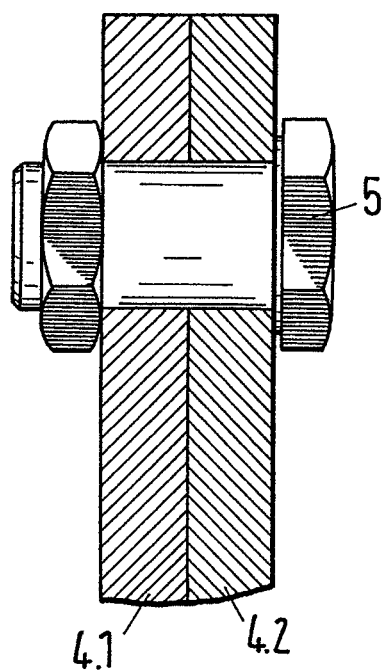
FIG. 3 an embodiment of a connection for the connection of adjacent storage racks.

In a further advantageous embodiment, the storage racks 1.1-1.3 are each provided with lateral braces 4.1-4.4. On a case by case basis, the storage racks can be provided on each side with at least three substantially vertically extending braces. The braces of adjacent storage racks are advantageously each connected to one another at the top, for example at the upper end and/or in an upper section, in particular at a section at the upper end, for example, as shown in FIG. 3, by means of bolts or screw connections 5, 5.1, 5.2. Two respective adjacent storage racks can also be connected to one another at the top in a different manner. For example, if the storage racks each contain an upper grating, for example in the form of a grid plate or terminal plate, or an upper frame, the upper grating or frame of the one storage rack can be connected to the upper grating or frame of the other storage rack.

Independently of the embodiment and embodiment variant of the storage racks 1.1-1.3, the base plate or base plates 2.1-2.3 or the support elements 6 or the support members 6a can be provided on the lower side with an additional sliding layer, for example a chromium layer.

Figure 2A:
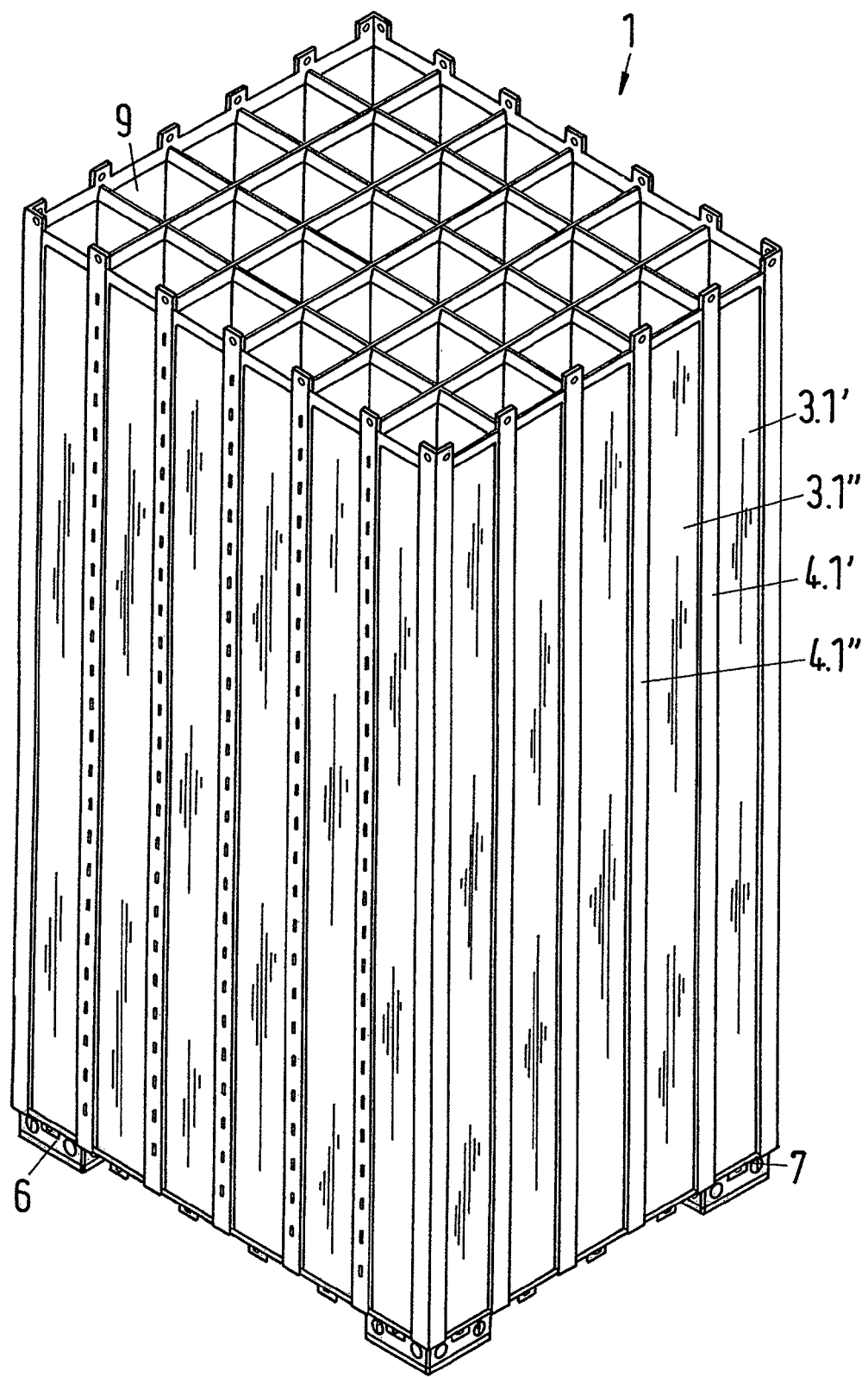
FIG. 2A an embodiment of a storage rack for a storage rack arrangement in accordance with the present invention, viewed obliquely from above.
Figure 2B:
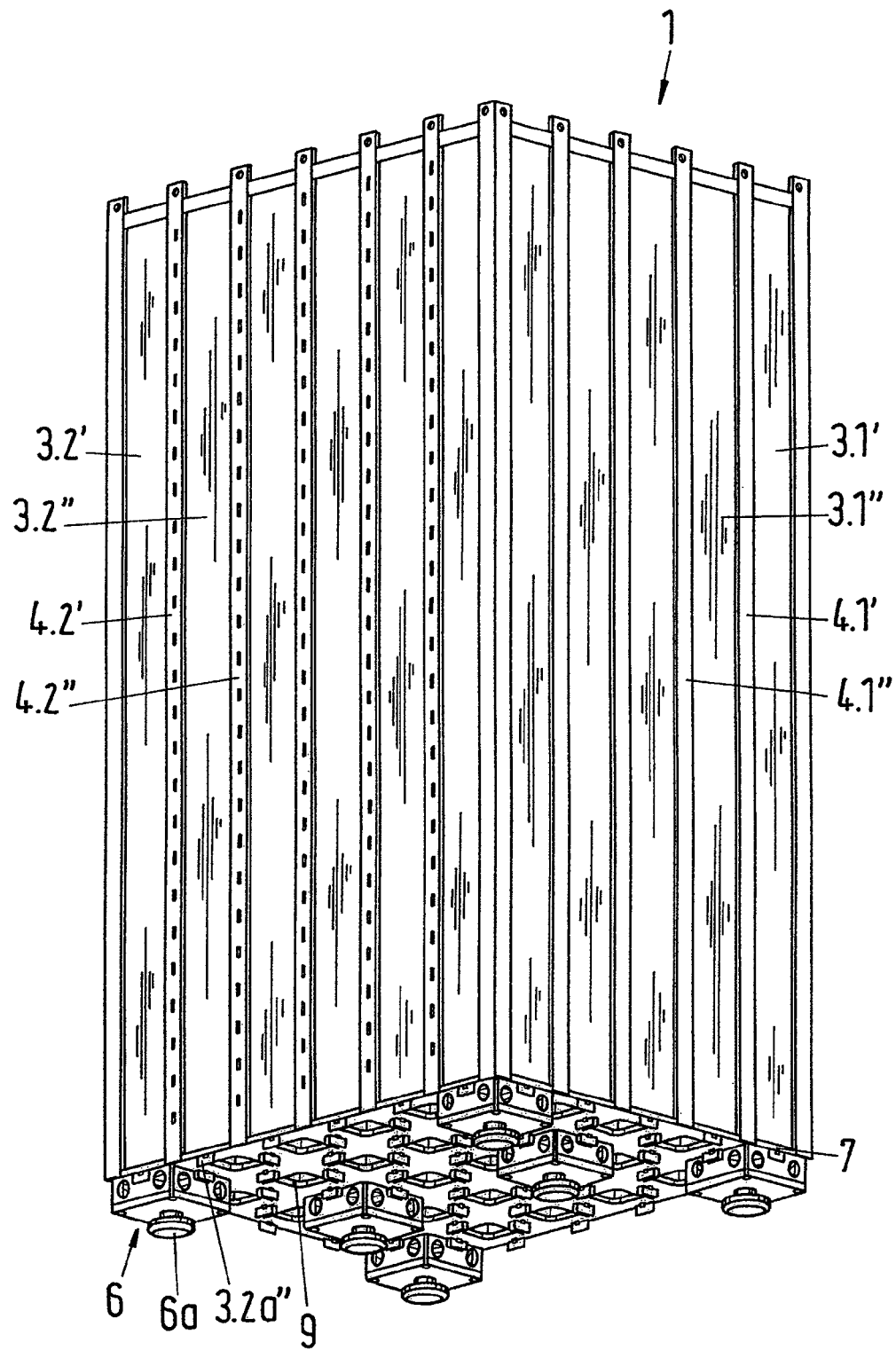
FIG. 2B the embodiment in accordance with FIG. 2A, viewed obliquely from below.

FIGS. 2A and 2B show an embodiment of a storage rack for a storage rack arrangement in accordance with the present invention; once viewed obliquely from above and once viewed obliquely from below. The storage rack 1 in the embodiment shown includes a channel structure which contains a plurality of channels 9 arranged next to one another with walls 3.1', 3.1", 3.2', 3.2" for the reception of the fuel elements and a support plate 7 which is connected to the channel structure. Furthermore, the storage rack 1 can, for example, include braces 4.1', 4.1", 4.2', 4.2" which can be connected to the support plate 7 and to the upper part of the channel structure. On a case by case basis, a grating and/or a terminal plate is/are provided in the upper part of the channel structure and the braces 4.1', 4.1", 4.2', 4.2" can be connected to them. In an advantageous embodiment, the braces 4.1', 4.1", 4.2', 4.2" are connected over the total height of the storage rack to the channel structure and/or to the walls 3.1', 3.1", 3.2', 3.2" of the channels, for example in a throughgoing, point-wise manner or at regular intervals. The channel structure is thereby stabilized with respect to the effect of vertical forces and the braces are secured against buckling.

In a further advantageous embodiment, the fuel elements are supported on the support plate 7 during storage. For this purpose, the support plate 7 can be provided with openings and/or slits and respective projecting cams 3.2a" can be formed at the channel structure and/or at the walls 3.1', 3.1", 3.2', 3.2" of the channels 9, said cams being pushed into or through the openings or slits of the support plate and being anchored and/or secured against being pulled out on the side of the support plate disposed opposite the channel structure. This embodiment has the advantage that the support plate can have a comparatively small material thickness since the support plate is stiffened sufficiently by the connection to the channel structure to take up the weight of the fuel elements.

The cams can, for example, as shown in FIG. 2B, project on the side of the support plate 7 disposed opposite the channel structure and can be anchored by means of latch elements, for example by means of wedges and/or straight or conical bolts and/or splints. Circulation openings 9a are advantageously provided in the support plate 7 so that the water contained in the storage pool can flow through the channels 9 on the storage of the fuel element to cool the fuel elements.

The channel structure and/or the walls 3.1', 3.1", 3.2', 3.2" of the channels 9 are advantageously made up of material absorbing neutrons such as a boron alloy or steel doped with boron or contain material absorbing neutrons. The channel structure can be made with double walls as required.

In a further advantageous embodiment, the storage rack 1 additionally includes one or more support elements 6 for the support of the storage rack and/or of the support plate 7. The support elements can, for example, be aligned or centered at the cams of the channel structure. The support elements 6 are on a case by case basis shaped from sheet metal or sheet metal parts, with the lateral metal sheets or metal sheet parts of the support elements advantageously being arranged on the side of the support plate disposed opposite the channel structure directly beneath the walls 3.1', 3.1", 3.2', 3.2" of the channels 9. The support elements 6 are advantageously fixable to selectable positions of the support plate, for example by means of bolts and/or screws. In an advantageous embodiment variant, the support elements 6 are each provided with support members 6a, for example with vertically adjustable support members, to support the storage rack 1 on the base plate or plates and/or on the floor of the storage pool. The support elements 6 or the support members 6a are advantageously used as positioning elements to position the storage rack 1 with respect to a base plate arranged beneath the storage rack.

The storage rack arrangement in accordance with the invention has the advantage that the storage racks cannot be individually displaced toward one another thanks to the positioning members on the base plate or base plates. Furthermore, thanks to the connection of the storage racks in the upper part and to the positioning members on the base plate or base plates, the security against earthquakes of the storage rack arrangement can be increased with respect to the initially described prior art in that both the horizontal component and the vertical component of shocks are effectively damped.

The invention claimed is:

1. A storage rack arrangement for the storage of nuclear fuel elements in a storage pool, wherein the storage rack arrangement (10) includes at least two storage racks (1, 1.1-1.3) which each contain a plurality of vertical channels (9) arranged next to one another for the reception of the fuel elements, and wherein positioning elements (6) are provided at the storage racks at the bottom, characterized in that storage racks (1, 1.1-1.3) arranged next to one another are connected to one another at the top; and in that the storage rack arrangement (10) additionally includes one or more base plates (2.1-2.3) which are provided with positioning members (8) which fit with the positioning elements (6) of the storage racks (1, 1.1-1.3) and which, together with the positioning elements, position the storage racks with respect to the base plate or base plates to prevent lateral movement of the storage racks relative to the base plate or plates.

2. A storage rack arrangement in accordance with claim 1, wherein the positioning elements (6) are made as support elements on which the storage racks (1, 1.1-1.3) are supported, and wherein the positioning members (8) are made as seats in the base plate or plates (2.1-2.3) or as projecting parts on the base plate or plates.

3. A storage rack arrangement in accordance with claim 1, wherein the support elements (6) are each provided with support members (6a), in particular with vertically adjustable support members, to support the storage racks (1, 1.1-1.3) on the base plate or plates (2.1-2.3) or on the floor 12 of the storage pool.

4. A storage rack arrangement in accordance with claim 1, wherein the positioning element (6) are each made, together with the associated positioning member (8),as a plug connection or as a holder with a part to be held.

5. A storage rack arrangement in accordance with claim 1, wherein the base plate or base plates (2.1-2.3) are displaceable on the floor (12) of the storage pool.

6. A storage rack arrangement in accordance with claim 1, wherein storage racks (1.1, 1.2) arranged next to one another are each positioned with or connected to at least one common base plate (2.1-2.3).

7. A storage rack arrangement in accordance with claim 1, wherein the base plates (2.1-2.3) are arranged at the periphery of the storage racks (1, 1.1-1.3), or wherein base plates are substantially arranged at the total periphery of the storage racks.

8. A storage rack arrangement in accordance with claim 1, wherein the base plate or base plates (2.1-2.3) extend over at least 80% of the base area of the storage rack arrangement (10) or substantially over the total base area of the storage rack arrangement.

9. A storage rack arrangement in accordance with claim 1, wherein the base plate or base plates (2.1-2.3) are larger than the base area of a storage rack (1, 1.1-1.3).

10. A storage rack arrangement in accordance with claim 1, wherein the base plate or base plates (2.1-2.3) project with respect to the storage racks (1, 1.1-1.3).

11. A storage rack arrangement in accordance with claim 1, wherein the base plates (2.1-2.3) are connected to one another independently of the connection of the storage racks (1, 1.1-1.3).

12. A storage rack arrangement in accordance with claim 1, wherein the storage racks (1, 1.1-1.3) are each provided with lateral braces (4.1-4.4, 4.1', 4.1", 4.2', 4.2").

13. A storage rack arrangement in accordance with claim 12, wherein the braces (4.1, 4.2; 4.3, 4.4) of adjacent storage racks (1.1-1.3) are connected to one another at an upper section of the storage racks (1.1-1.3).

14. A storage rack in accordance with claim 13, wherein the braces (4.1, 4.2; 4.3, 4.4) of adjacent storage racks (1.1-1.3) are each connected to one another by means of a screw connection (5, 5.1, 5.2).

15. A storage rack arrangement in accordance with claim 1, wherein the storage racks (1, 1.1-1.3) are provided on each side with at least three substantially vertically extending braces (4.1', 4.1", 4.2', 4.2").

16. A storage rack arrangement in accordance with claim 1, wherein the positioning elements (6) and the positioning members (8) are configured to collectively fix the storage racks (1, 1.1-1.3) within a prescribed horizontal position with respect to the base plate (2.1-2.3).

17. A storage rack arrangement in accordance with claim 1, wherein the base plate (2.1-2.3) and storage racks (1, 1.1-1.3) are configured to be interconnected independent of a fixed connection therebetween.

18. A storage rack arrangement for the storage of nuclear fuel elements in a storage pool, the storage rack arrangement (10) comprising:
at least two storage racks (1, 1.1-1.3) connected to each other, each storage rack including:
a plurality of vertical channels (9) arranged next to one another for the reception of the fuel elements; and
a plurality of positioning elements (6) coupled to the storage racks and selectively positional thereon;
at least one base plate (2.1-2.3) including positioning members (8) sized and configured to fit with the positioning elements (6) of the storage racks (1, 1.1-1.3) to collectively position the storage racks (1, 1.1-1.3) with respect to the at least one base plate (2.1-2.3) to prevent lateral movement of the storage racks (1, 1.1-1.3) relative to the base plate (2.1-2.3).

19. A storage rack arrangement in accordance with claim 18, wherein the positioning elements (6) and the positioning members (8) collectively fix the storage racks (1, 1.1-1.3) within a prescribed horizontal position with respect to the base plate (2.1-2.3).

20. A storage rack arrangement in accordance with claim 18, wherein the base plate (2.1-2.3) and storage rack (1, 1.1-1.3) are configured to be interconnected independent of a fixed connection therebetween.

* * * * *